US005589391A

United States Patent [19]
Fink

[11] Patent Number: 5,589,391
[45] Date of Patent: Dec. 31, 1996

[54] ROTATABLE COMPOSTING DEVICE

[76] Inventor: Thomas M. Fink, 6 Bassett Pl., Fairfield, Ohio 45014

[21] Appl. No.: 170,787

[22] Filed: Dec. 21, 1993

[51] Int. Cl.⁶ .................................................. C12M 1/10
[52] U.S. Cl. ...................... 435/290.3; 220/4.09; 220/4.33
[58] Field of Search ................................... 435/287, 312, 435/316, 315; 422/184, 209; 366/220, 233, 236; 71/8–10; 220/4.04, 4.08, 4.09, 4.11, 4.16, 4.28, 4.33, 692, 693

[56] References Cited

U.S. PATENT DOCUMENTS

| 466,671 | 1/1892 | Gale | 366/220 |
|---|---|---|---|
| 1,212,859 | 1/1917 | Weiss | 366/220 |
| 1,328,119 | 1/1920 | Brayman | 366/220 |
| 3,760,970 | 9/1973 | Lutz | 220/4.33 |
| 3,837,810 | 9/1974 | Richards | 71/9 |
| 3,890,129 | 6/1975 | Chester | 435/312 |
| 3,942,769 | 3/1976 | Whiteside et al. | 366/233 |
| 5,215,267 | 6/1993 | Taylor | 435/316 |

FOREIGN PATENT DOCUMENTS

| 0074765 | 9/1952 | Denmark | 366/220 |
|---|---|---|---|
| 0210382 | 2/1987 | European Pat. Off. | 435/312 |
| 3217725 | 4/1983 | Germany | 435/287 |
| 3819979 | 8/1989 | Germany | 71/9 |
| 3805040 | 8/1989 | Germany | 435/287 |
| 0490833 | 8/1955 | Italy | 220/4.33 |
| 1111988 | 5/1986 | Japan | 435/312 |

Primary Examiner—William H. Beisner
Attorney, Agent, or Firm—Richard J. Johnson

[57] ABSTRACT

A composting device comprising a hexagonal shaped drum mounted for rotation on a support base. The support base includes an enclosed area for storage of material to be composted or completed compost. The device is designed to be constructed by a homeowner from a kit of hardware parts and a package of precut pressure treated or otherwise weather resistant lumber provided by a building supply retail outlet store. The kit includes all necessary hardware parts which are predrilled and ready for assembly.

17 Claims, 3 Drawing Sheets

ROTATABLE COMPOSTING DEVICE

FIELD OF THE INVENTION

This invention relates to a rotatable drum composting device and to a kit for making a composting device.

BACKGROUND OF THE INVENTION

The composting of a wide variety of organic materials, such as, leaves, grass clippings, small twigs, and certain household scraps that were previously viewed as trash has become an important and necessary matter for homeowners to consider. Municipal landfills are rapidly filling with trash and waste materials of all types at an alarming rate. Many municipalities have instituted recycling programs for a wide variety of materials to reduce the volume of trash being hauled to landfills and to conserve natural resources. A number of jurisdictions are now refusing to accept leaves and grass clippings requiring individual homeowners to compost these organic yard waste materials formerly transported to landfills.

Composting is a natural way of recycling organic wastes using a natural process in which the organic materials are converted by bacteria into compost which may then be used as a soil conditioner and nutritive additive. A wide variety of composting devices have appeared on the market each designed to receive organic wastes such as leaves, grass clippings, etc. therein while they are allowed to decompose, a process which under normal conditions usually requires a number of months and sometimes an entire season. It has been recognized in the art that the process of decomposition can be accelerated by using a variety of techniques. Such include the addition of moisture when the materials are dry, certain table scraps to stimulate bacterial growth, and certain additives which are currently available to speed the decomposition process. Also, it is known that the bacterial decomposition can be greatly accelerated by periodically stirring the compost pile. This is because the initial phase of the decomposition process is aerobic and proceeds most rapidly if oxygen is available around the materials being decomposed. This requires some stirring or mixing of a compost pile such as with a fork or other tool to lift materials up from the bottom and intermix them with other materials in the pile which thereby allows oxygen to reach the bacteria. However, since considerable strength is usually required for turning and mixing the materials, which must be repeated every few days for optimal benefits, this procedure often discourages many potential composters.

During the initial aerobic decomposition phase heat is generated which should be retained within the materials to keep the decomposition proceeding as rapidly as possible. Thus, the materials used to construct the composting container should have some insulating properties to restrict the rapid loss of the generated heat. At the same time, some air must be able to enter the composting chamber.

An additional requirement for a composting device is that it be sufficiently rugged to withstand heavy loads when necessary without danger of collapsing. Also, it must be sufficiently attractive in appearance so that it may be left visible in a back yard and blend with any other structures such as decks, steps or wooden fences. Additionally, the unit must be weather resistant, have an extended useful life and yet be affordable to the majority of potential users.

In order to reduce the physical labor required for stirring the composting materials, rotating drum type composters have been proposed. Various configurations of rotatable drum, such as, cylindrical and octagonal have been proposed. Other configurations have included square and octagonal. Examples of such composters are shown in U.S. Pat. Nos. 2,241,734, 3,054,663, 3,041,148 and 3,890,129. The last mentioned patent comprises an octagonal shaped metal framework that is enclosed on its sides with open-mesh material such as hardware cloth or expanded metal.

SUMMARY OF THE INVENTION

The composting device disclosed herein has been designed with the above listed criteria in mind. It is rugged yet attractive in appearance; it is weather and decay resistant; it can be produced in varying capacity; it is efficient in operation; and it is relatively inexpensive to construct. My composting device is ruggedly attractive and will complement most homeowner backyard decor.

Materials commonly used in exposed outdoor construction, such as, back steps, decks, fences, etc. are cedar and redwood, and pressure treated pine. These materials are usually able to withstand exposure to the weather for many years. Lumber and "do-it-yourself" builder supply type stores accumulate curved, twisted, or knotty pieces that have been "picked over" and cannot be sold. Such lumber is normally considered as waste and disposed of. My invention has been designed to help such stores to utilize these otherwise waste materials.

Normally at least some portion of such defective board is usable. Thus, by cutting full length unusable boards into shorter sections to reduce or minimize undesirable board curvature while cutting out and discarding sections having large knots or other major defects the majority of such lumber can be sold. A package of lumber, precut to shorter lengths according to model size, along with my hardware kit can thus be offered for sale as part of a complete package ready to be assembled by a homeowner purchaser using only a minimum of tools. As an alternative, the kit may be assembled by the retailer at his store and sold ready to use or delivered and then assembled by an store employee if such is requested. As a further option, the hardware kit could be sold separately and the purchaser could obtain the lumber from a different source. Initial results have shown my composting device to have significant appeal to a wide variety of retailers and to potential users.

A primary object is to provide a kit or assembly of parts containing all the necessary hardware that, together with a lumber package for a selected size model, will enable a homeowner to construct a composting device as disclosed and claimed herein. The hardware items are preferably of galvanized steel. However, plastic, aluminum and other rust and weather resistant materials can be used.

A further object of the invention is to provide a composting device which is able to convert organic waste materials such as leaves, grass clippings, small twigs, and certain household scraps or the like into usable compost in an effective and efficient manner without requiring the heavy physical labor involved in layering and periodically turning and mixing the composting materials.

A further object is to provide a composting device that can be constructed by a homeowner using a prepackaged kit of components and instructions supplied by or according to the invention as disclosed herein and utilizing normally waste lumber provided by lumber or building supply centers that has been precut to size according to specific models and bundled to be sold as part of a complete package of materials necessary to build the selected model.

A further object is to provide a composting device that substantially eliminates the heavy manual labor associated with rapid efficient composting.

A further object is to provide an efficient, rugged and yet attractive composting device that will complement the decor of most backyards.

Other objects and advantages of the invention will be better understood and become apparent from the invention disclosure which follows.

DETAILED DESCRIPTION OF THE INVENTION

Figure 1:
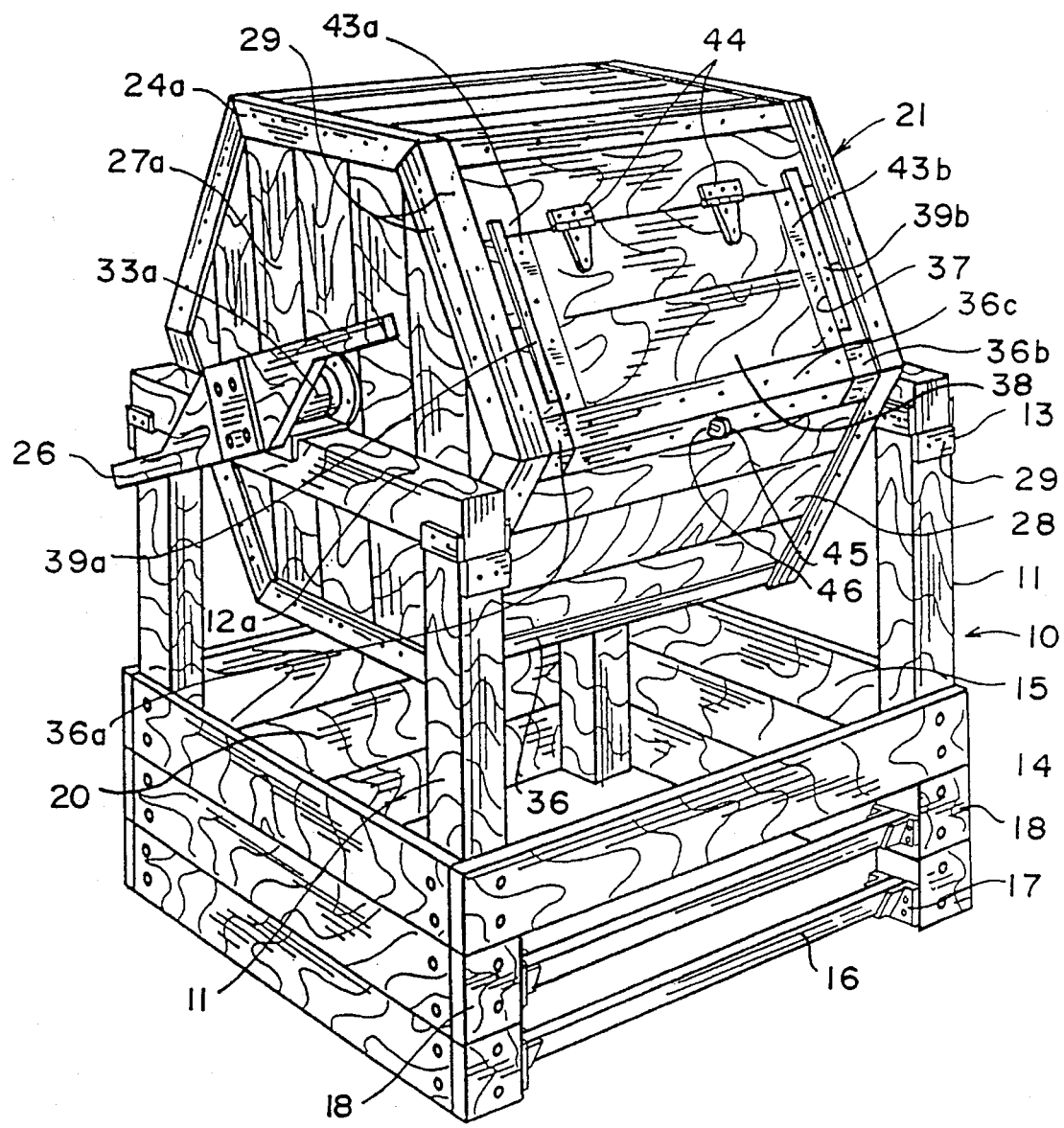
FIG. 1 is a perspective view of my combined compost tumbler and storage bin.
Figure 2:
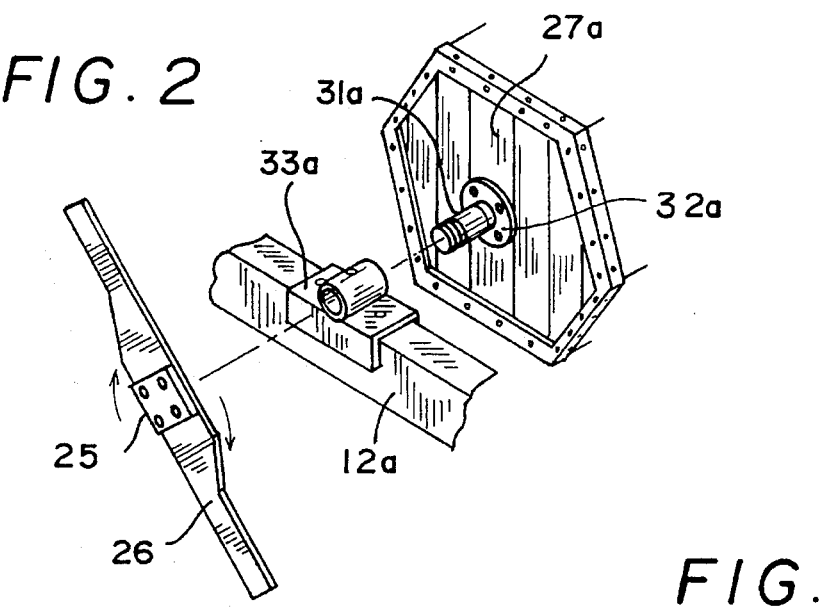
FIG. 2 is an exploded view of the left end of the tumbler as viewed in FIG. 1.

Reference will now be made to the detailed description wherein numerals used in the specification are used to refer to corresponding elements in the drawings. Numerals including the letters "a" or "b" apply to left end and right end elements, respectively, whichp are arranged in mirror image fashion.

A base unit 10 is comprised of four vertical support leg members 11. Cross beams 12a, 12b, are positioned across the upper ends of the leg members 11 and are secured thereto by galvanized steel frame support connectors 13 using screws 29. Side boards 14 and end boards 15 are secured by nails or screws to the vertical leg members 11 as shown in FIG. 1 to form a storage enclosure 20. A number of angled slats 16 are slidably retained by U-shaped slat brackets 17 secured to the inwardly oppositely facing sides of front legs 11. The slats 16 can be removed to permit a fork or shovel to be inserted into the storage area to withdraw material. Short facing pieces 18 cover the front part of the legs 11 at the ends of the slats 16.

The composting apparatus illustrated in FIG. 1 includes a hexagonal shaped tumbler drum 21 mounted for rotation on the base unit 10. The tumbler 21 includes rigid hexagonal shaped galvanized steel end frames 24a, 24b of right angle cross-section. The right angle flanges of the frames 24a, 24b serve as supports for the boards which form the end walls 27a, 27b, and horizontally arranged boards forming the sidewalls 28, respectively, of the drum. Predrilled openings spaced along the flanges of the end frames 24a, 24b, permit screws 29 or other fastener means to secure the individual end and sidewall boards in place.

Galvanized circular floor flanges 32a, 32b, are bolted to the center portions of respective tumbler end walls 27a, 27b. Each floor flange 32 includes a threaded central collar into which threaded galvanized steel pipe nipples 31 are threaded. Turning axle supports 33a, 33b are secured to respective cross-beams 12a, 12b, and rotatably receive the respective nipples 31 which thereby serve as rotational supports for the drum. An additional floor flange 32 is secured to the inner surface of the rotating handle 26 and is threadedly secured to the opposite end of nipple 31a. A predrilled reinforcing plate 25 is positioned on the outer face of the turning handle 26 through which securing bolts are passed to secure the floor flange to the handle. A threaded cap 34 locks the nipple 31b within the turning axle support 33b. Grease fittings are threaded into openings in the turning axle supports to provide for lubrication.

Longitudinally extending angled corner reinforcing braces 36 cover each of the outside corners of the hexagonal drum and are secured thereto by threaded fasteners 29 extending through predrilled openings in the braces. An access opening 37, closed by a hinged door 38, is formed in one of the hexagonal sides of the tumbler. Z-shaped door frame brackets 39a, 39b, are secured to the lateral edges of the boards adjacent the door opening. The lateral ends of the door are reinforced by U-shaped captivator brackets 43a, 43b. The corner brace member 36 along the door opening edge is divided into three sections. Sections 36a and 36b are secured along the tumbler corner between the door opening 37 and a respective end flange of the drum. A further section 36c is secured to the lower edge of the door 38. It serves as a locating stop for the door and as a means for securing it closed. Hinges 44 secured to the tumbler sidewall and to the upper edge of the door permit it to be pivoted upwardly out of the way. A rotatable latch 45 cooperates with slot 46 in member 36c to lock the door closed.

In use, materials such as leaves, grass clippings, etc. are loaded into the tumbler 21 through the opening 37. The door 38 is closed and the latch 45 rotated to its secured position. Every several days the drum is rotated several times using the handle 26 to mix and aerate the contents. Because of the cross-sectional configuration of the drum the materials are tumbled and intermixed rather than merely sliding along the tumbler inner surface as in a cylindrical drum. Heat generated during the aerobic bacterial decomposition which may reach 160 degrees F. is substantially retained due to the insulating properties of the wood materials. Some air enters the drum through the cracks between the boards to supply needed oxygen to keep the bacterial decomposition proceeding. After the process is completed in approximately two weeks the door 38 is opened and the contents emptied. If desired a separating screen may be placed over the door opening allowing larger particles to be retained for further decomposition. Alternatively, the compost may be deposited on a separating screen to be shaken.

The storage chamber 20 is an important part of the invention. When the quantity of materials to be composted is more than what will fill the tumbler the excess may be temporarily placed in the storage chamber. Later, as completed compost is removed from the tumbler, or the materials in the chamber shrink in volume, further materials may be withdrawn from the storage area by removing the slats 16 and then by using a fork or shovel loading such into the tumbler. Alternatively, the storage area may be used to store completed compost.

The composting device is preferably constructed of pressure treated pine, cedar or redwood lumber. The board size is preferably the type referred to as 5/4"×6" and which has slightly rounded corners. The leg members are preferably of conventional 4"×4" size. A practical feature of the invention is that the same hardware package may be used to construct different sized models merely by substituting different length boards. For example, two current models have been designed to produce tumblers having either 14 cubic ft or 22 cubic ft capacity using the same hardware kit. The lower bin storage capacity of these units is 15 and 27.5 cubic ft, respectively. The rugged design is sturdy and long lasting and yet is attractive in appearance to blend with other backyard structures. All units utilize short lengths of lumber which would otherwise be discarded as waste permitting the conservation of valuable resources. The hardware items are preferably of galvanized steel. However, plastic, aluminum and other rust and weather resistant materials can be used.

Although the tumbler has been described as being of hexagonal shape the invention is not limited to such configuration. Other configurations, such as, square, pentagonal or octagonal would also perform in a generally satisfactory manner and are within the scope of the invention.

Figure 5:
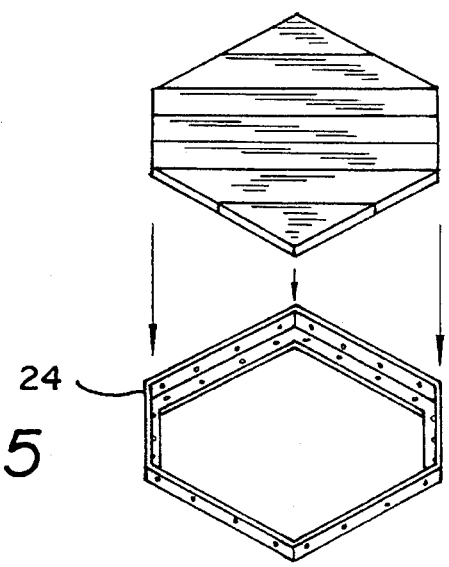
FIG. 5 is an exploded view illustrating the cut boards of FIG. 4 fitted within an end frame.
Figure 6:
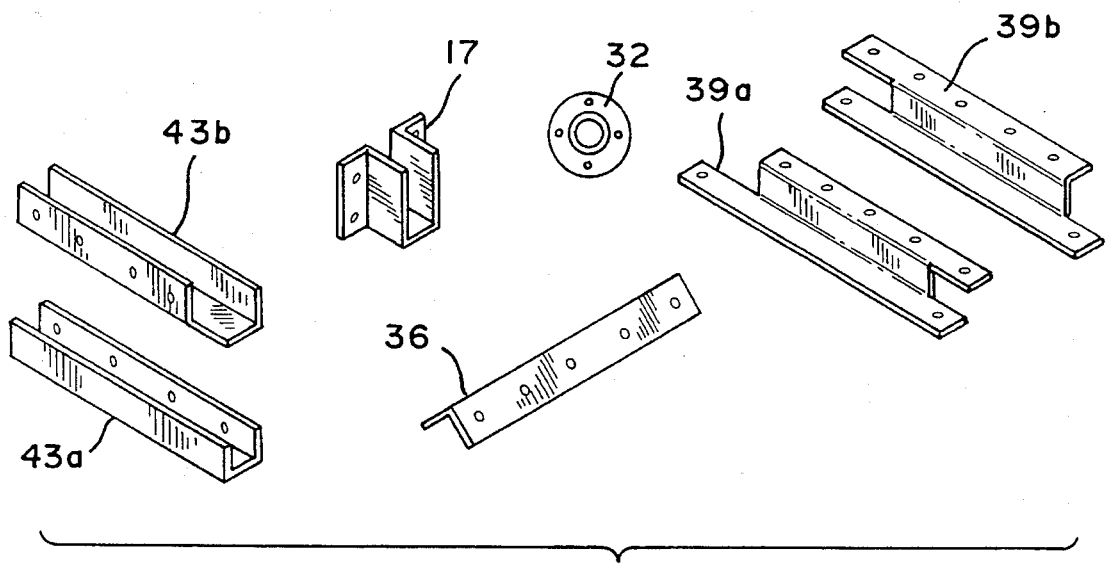
FIG. 6 is a perspective view of some of the major components of the kit not shown elsewhere.
Figure 7:
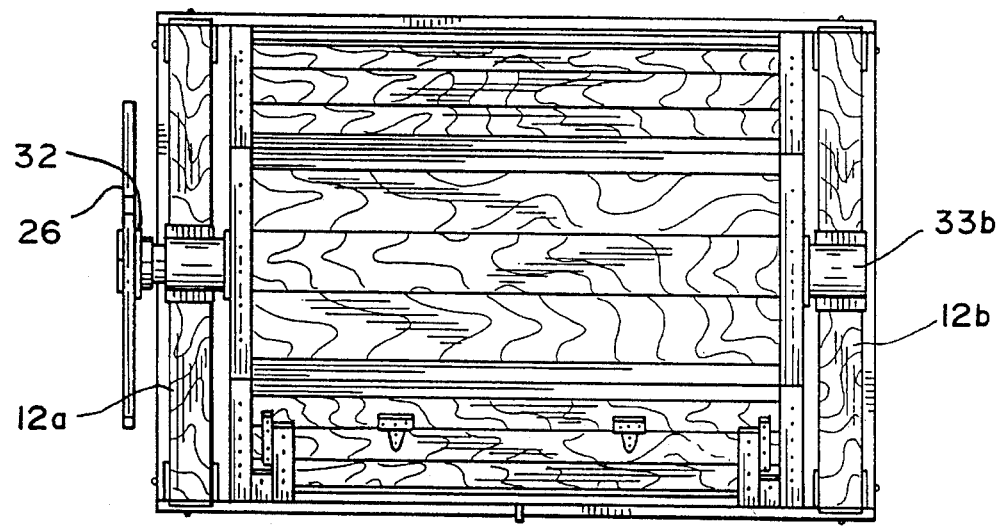
FIG. 7 is a top view of the assembled unit.

FIGS. 5 and 6 illustrate the primary components of the hardware kit. Each component is identified by a numeral corresponding to its usage in the description above.

Figure 4:
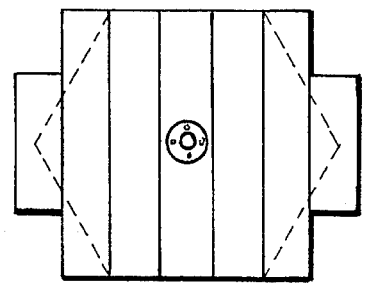
FIG. 4 is a diagrammatic view illustrating pieces of lumber arranged to be marked and cut to form an end wall.
Figure 3:
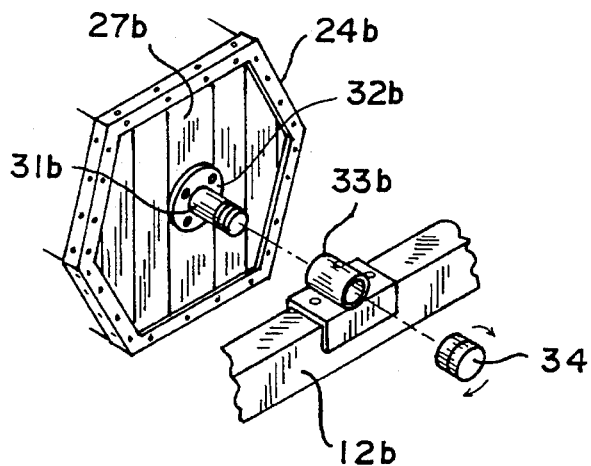
FIG. 3 is an exploded view of the right end of the tumbler.

FIGS. 4 and 5 illustrate how the boards may be arranged to be marked for cutting to produce the tumbler end walls.

Having disclosed my invention I claim:

1. A composting device comprising, a support base unit, a hollow enclosed tumbler drum of polygonal shaped cross-section having sidewalls and endwalls, said drum comprising a unitary rigid polygonal shaped end frame surrounding each endwall and directly secured thereto, a plurality of discrete boards extending between and secured to the end frames to form the sidewalls of the drum, an angle corner covering and reinforcing member secured to said boards along the exterior of each corner of said polygonal shaped drum, a door in said drum for loading material into said drum, said drum being mounted on said base unit for rotation about a horizontal central longitudinal axis through the endwalls of the drum, wherein the support base unit is rectangular in plan and comprises upright corner leg members and wherein the leg members at opposite ends of the base unit are connected at their upper ends by a cross-member which supports a respective end of said drum, said sidewalls being constructed such that cracks are formed between each adjacent board whereby air may enter the drum.

2. The composting device of claim 1 wherein each endwall is constructed from a plurality of discrete boards.

3. The composting device of claim 1, wherein the drum is hexagonal shaped in cross section.

4. The composting device of claim 1, wherein the tumbler drum endwalls each have a pivot nipple secured thereto, a pivot axle support mounted on each of said cross-members and each of said pivot nipples is mounted for rotation in one of said axle supports.

5. The composting device of claim 4 further including a handle secured to one of said nipples for rotating said drum.

6. The composting device of claim 1, wherein a lower portion of the base unit includes a plurality of boards secured to the leg members whereby to enclose the sides and ends thereof to form a storage enclosure beneath the tumbler.

7. The composting device of claim 6 wherein one side of said storage enclosure includes a plurality of removable slats.

8. The composting device of claim 1 wherein the leg members are square and approximately 4"×4" in cross-section.

9. The composting device of claim 1 wherein the tumbler drum and base unit are constructed from pressure treated lumber.

10. A hardware kit for use in constructing a substantially wooden composting device comprising, a pair of discrete rigid polygonal shaped end frames of substantially right angle cross-section, a plurality of discrete angled corner covering and reinforcing members of substantially equal length adapted to be positioned between the end frames and wherein the end frames and angled corner members each include a plurality of spaced openings adapted to receive fastening means, said kit further including at least two circular disc-shaped floor flanges having internally threaded collars, a pair of nipples threaded at each end and sized to be threaded into said collars, and a pair of turning axle supports sized to rotatably receive said nipples.

11. The kit of claim 10 further including a pair of generally U-shaped channel members to fit over the ends of a door, a pair of generally Z-shaped door frame members.

12. A composting device comprising, a support base unit, an enclosed tumbler drum of polygonal shaped cross-section having sidewalls and endwalls, said drum comprising a rigid polygonal shaped end frame at each end thereof, each sidewall of said drum including a plurality of elongated nonmetallic boards extending between and secured to the end frames, a separate angle corner member extending along and covering and reinforcing each sidewall corner of said polygonal shaped drum, a door in one of said sidewalls for loading material into said drum, said base unit being generally rectangular in plan and comprising upright corner leg members and wherein the leg members at opposite ends of the base are connected at their upper ends by a cross-member, each cross-member rotatably supporting a respective end of said drum, said sidewalls and endwalls being constructed such that cracks are formed between adjacent boards whereby air may enter the drum.

13. The composting device of claim 12 wherein a lower portion of the base unit includes a plurality of boards secured to the leg members whereby to enclose the lower portion of the sides and ends thereof to form a storage enclosure beneath the tumbler drum.

14. The composting device of claim 13 wherein one of the sides of the base unit includes a plurality of removable slat members.

15. The composting device of claim 12 wherein the leg members are square and approximately 4"×4" in cross-section.

16. The composting device of claim 12 wherein the tumbler and base unit are constructed from pressure treated lumber.

17. The composting device of claim 12 including handle means for rotating the drum.

\* \* \* \* \*